Sept. 5, 1939.    R. WALDO    2,172,229
INSULATION DEMONSTRATING DEVICE
Filed June 1, 1937
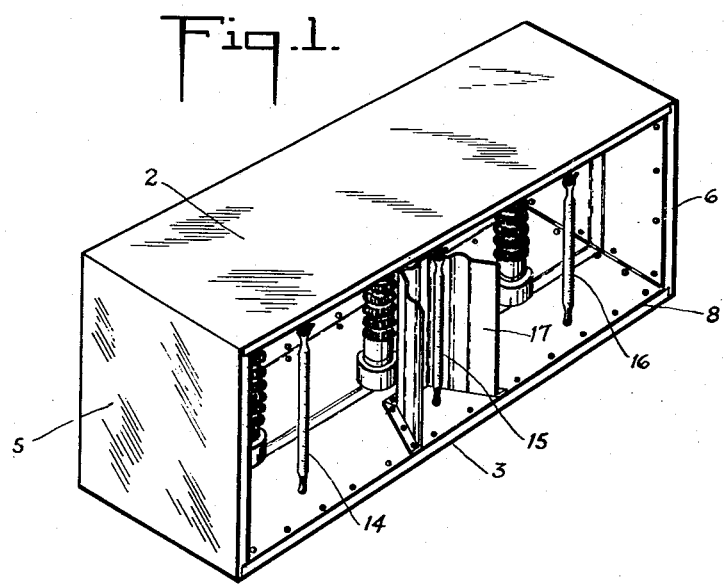
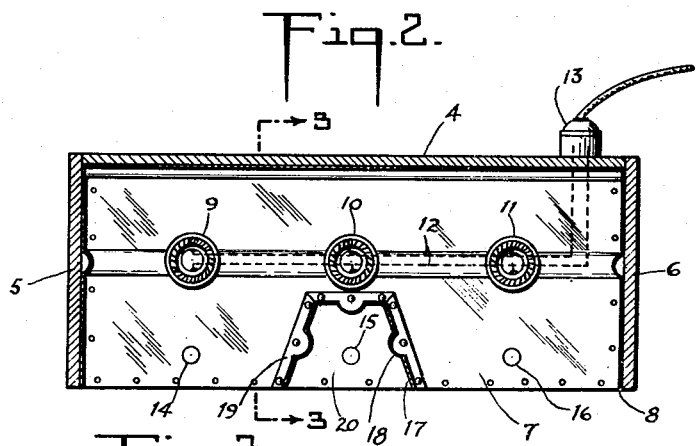
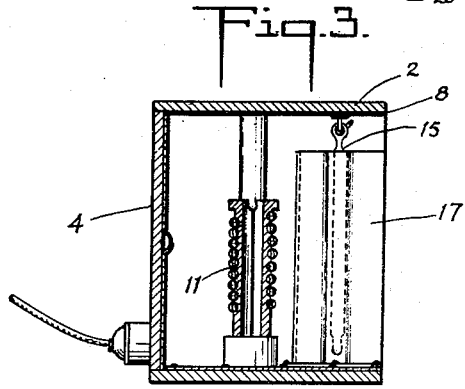
INVENTOR.
ROBERT WALDO
BY
*Albert M. Parker*
ATTORNEY.

Patented Sept. 5, 1939

2,172,229

UNITED STATES PATENT OFFICE 2,172,229

INSULATION DEMONSTRATING DEVICE

Robert Waldo, New York, N. Y., assignor to American Flange & Manufacturing Co., Inc., New York, N. Y., a corporation of Illinois Application June 1, 1937, Serial No. 145,780

6 Claims. (Cl. 35—19)

This invention relates to devices for demonstrating the effectiveness of heat insulating materials and has to do more particularly with such devices which will effectively demonstrate to the technician and layman alike.

The principal object of the invention is to provide a simple and inexpensive demonstration device which will attract attention and provide a lasting impression once the attention has been attracted.

Another object of the invention is to provide a demonstration device which will attract attention by means of heat propagation.

Still another object of the invention is to provide a device which will demonstrate the effectiveness of insulating material generally through the actual perception of temperature difference.

A further object of the invention is to provide a device which will give an exact demonstration of the effectiveness of insulating material by means of indicating devices.

Other objects of the invention will in part be obvious and in part appear hereinafter.

Devices for demonstrating the effectiveness of heat insulating materials as heretofore employed had many drawbacks. In the first place, they were expensive and cumbersome and were inclined to have delicate working parts which easily got out of order and thus failed to give a true indication of conditions. The demonstrations that these devices gave had little to attract one to them and were of a nature not readily understandable to the layman; in fact they would repel rather than attract the average passerby because they had a highly technical appearance and little, if any, color to commend them. The present invention, on the contrary, eliminates the drawbacks of the prior art devices yet does so by simplification rather than complexity.

In the device constructed in accordance with this invention a large amount of heat is produced by elements of a simple type within a light weight open sided box which has a heat reflecting lining. Thermometers are employed adjacent each heating element and a shield of insulating material is used to isolate one of the thermometers from direct heat rays from the sources. The device can be readily moved and placed upon a table or stand and has all of its elements open in plain view of anyone who may pass by. The heating elements glow with a cherry red color and give off considerable radiant energy, which cannot help make itself felt to the passersby and thereby attract their attention without reliance being placed on their sense of sight. Upon drawing closer, the subject sees a plurality of ordinary thermometers such as he is well accustomed to reading but even before reading the same he will no doubt make a rough estimate of the temperature difference by holding his hand first before the open portion of the box and then insert it into the shield. The marked difference in temperature here cannot help but make itself felt and produce a lasting impression, even though the first rough test be not followed by the reading of the thermometers and the recognition of the effectiveness of the insulation which they indicate.

It will be obvious that this device is inexpensive, portable, runs continuously, can be used with the ordinary sources of house current and is most effective as a demonstrator. Further, its simplicity commends it and assures those present that they are being subjected to an accurate, honest demonstration.

For a fuller understanding of the nature and objects of the invention reference should be had to the following detailed description of the embodiment shown in the accompanying drawing in which:

Fig. 1 is a perspective view of the demonstration device in accordance with the invention;

Fig. 2 is a horizontal section taken looking down just below the top of the device as shown in Fig. 1; and Fig. 3 is a vertical section taken on line 3—3 of Fig. 2.

The outside contour of the device of this invention, in the form shown, is that of a rectangular box having a top 2, bottom 3, back wall 4, ends 5 and 6 and an open front as shown at 7. For the purposes of reflecting heat and insulating the wall of the box for protection of the same, it is lined throughout with metallic reflecting insulating material of a well-known type, shown generally at 8. As shown, insulating material 8 is in the form of a single sheet affixed directly to the inner walls of the box, but this is done merely for the sake of simplicity of illustration as the best effect can be produced with this type of material when a plurality of spaced sheets of the same are employed, being separated from one another and from the wall to be insulated by dead air spaces. As this type of insulation is thoroughly described in the patent to Le Grand 1,910,703, it is not thought necessary to go into a detailed discussion concerning it here.

Mounted on the insulated bottom or base 3 of the device and preferably on a line parallel to the back thereof are heat elements 9, 10 and 11 of conventional type. These, as shown by dotted lines 12, are connected in parallel in an ordinary lighting circuit current from which is fed in by means of plug 13. Heating elements of this general type are made up in various forms, all of which are well-known and any of which could be used here—hence, no detailed description of the particular one shown is thought necessary.

Suspended from the inside of the insulated top just inside the open face 7 of the box and on a line parallel to that of the heating elements are thermometers 14, 15 and 16. As shown each thermometer is paired off in opposed relation to one of the heating elements, but obviously some other arrangement could be followed if found more desirable. In the preferred form these thermometers are of the standard 220° F. red element type so that their indication is plainly visible.

A shield 17 of metallic reflecting insulating material is shown insulating thermometer 15 on the back and two sides from the heating elements 9, 10 and 11. Shield 17 is corrugated at 18 and in other respects is generally similar to the material set forth in the patent to Le Grand No. 1,910,703. Other insulating materials could of course be formed into a shield and fitted into the device should it be desired to demonstrate their effectiveness; but the particular metallic reflecting material shown has characteristics which are made most evident by this form of demonstration. The shield 17 has a flange, or foot, 19 formed therearound by means of which it may be secured in any desired manner to the container bottom 3, small brads being shown, for purposes of illustration, as the securing means. Shield 17 opens outwardly at 20 in the same direction as does the mouth 7. Inasmuch as the side walls of said shield diverge outwardly sufficient space is provided therein for the reception of thermometer 15 as well as for the reception of a portion of the hand of any one interested.

Although the function and operation of this device may be obvious from the foregoing, it is thought that a brief résumé may help to clarify any ambiguities existing. In the first place, this device is intended to be used as a display at conventions, expositions, and the like where a good number of people are passing by but where not many are attracted unless the display is somewhat unusual. By providing the heating elements shown and covering the inside of the container with material which performs the dual function of insulating against heat seeking to escape through the walls of the box and throwing all the heat out of the open side of the box by means of reflection, it has been found that passersby are immediately attracted by the strong concentrated flood of radiant heat to which they are subjected. The normal response to such attraction is to draw near and examine the cause, which examination will take the form of reading the thermometers or holding the hand in the insulated and uninsulated areas, or both. Either one of these tests will create a lasting impression due to the great temperature difference present. This difference under actual demonstrating conditions is very marked since thermometer 15 indicates only about 5° F. above room temperature, while the readings of thermometers 14 and 16 run anywhere from 100° F. to 110° F. above that of thermometer 15. Furthermore, the lack of moving parts, sound effects or any accompanying remarks make the demonstration a particularly desirable one because the passerby is allowed to see for himself and judge for himself. In other words, the device and the device alone does the demonstrating.

Although a particular type of heat element has been shown, it is considered to be within the scope of the invention to vary this element by employing any type known which performs the same function. The scope of the invention is also considered to embrace substitution of any desired radiant energy indicating device, such as a thermopile, thermocouple or the like for the simple thermometers shown.

Since these and other changes may be made in the above construction and different embodiments of the invention may be made without departing from the scope thereof, it is intended that all matter contained in the above description or shown in the accompanying drawing be interpreted as illustrative rather than in a limiting sense.

Having described my invention, what I claim as new and desire to secure by Letters Patent is:

1. In a demonstration device, a housing open on one face, heating means adjacent a wall of the housing, temperature indicating means spaced from said heating means, and insulation means isolating a portion of said open face and shielding said indicating means from said heating means, access to said indicating means being unobstructed on the side thereof remote from said heating means.

2. In a demonstration device, a housing open on one face and having heat reflecting walls, heating means within the housing, temperature indicating means within the housing spaced from said heating means and on the side thereof remote from said heat reflecting walls and a heat insulating member isolating a part of said open face and having a portion interposed between said heating means and said temperature indicating means, said insulating member leaving said temperature indicating means unobstructed in the direction of the opening in said housing.

3. In a demonstration device, a heat reflecting wall, heating elements adjacent said wall, temperature indicating elements on the side of said heating elements remote from said wall and a heat insulating shield interposed between one of said heating elements and an adjacent temperature indicating element and spaced from the same, said shield isolating said one temperature indicating element from a portion of the heat band projected by said elements and said heat reflecting wall, whereby both precise and general demonstrations of the effectiveness of said insulating shield can be effected simultaneously.

4. In a demonstration device, a housing open on one face, and having heat reflecting walls, a plurality of heating elements within said housing, a plurality of temperature indicating elements adjacent the open face of said housing in opposed relation to said heating elements, and a shield of insulating material extending inwardly from the open face of said housing and having a portion thereof interposed between one of said heating elements and an opposed indicating element.

5. In a demonstration device, a housing closed on three faces but having its remaining face open, the interior of said housing being lined with heat reflecting material, a plurality of heat radiating elements within said housing arranged to project intense radiant energy out of said open face, and a heat insulating shield mounted at said open face in opposed relation to one of said heat radiating elements and being formed to receive part of the hand of an observer, whereby passers by are attracted by said projected beam and are enabled to estimate the effectiveness of said insulating material.

6. In a demonstration device, means to generate radiant energy, means to concentrate and direct the energy from said generating means in substantially one direction and means in the path of direction of said energy to isolate an area in said path from the effects of that energy, whereby through the sense of feel one may obtain an actual perception of the difference in temperature caused by the radiant energy in said isolated area and in the remainder of said path.

ROBERT WALDO.